United States Patent [19]

Menchetti

[11] Patent Number: 4,800,695
[45] Date of Patent: Jan. 31, 1989

[54] ELECTRICAL RACEWAY FLOOR TRACK

[75] Inventor: Robert J. Menchetti, Buffalo, N.Y.

[73] Assignee: National Gypsum Company, Dallas, Tex.

[21] Appl. No.: 103,628

[22] Filed: Oct. 2, 1987

[51] Int. Cl.$^4$ .......................... E04F 17/08; H02G 3/10
[52] U.S. Cl. ........................................ 52/221; 174/49; 439/215
[58] Field of Search .................. 52/220, 221, 290, 729; 174/48, 49; 439/207, 209, 211

[56] References Cited

U.S. PATENT DOCUMENTS

| | | | |
|---|---|---|---|
| 1,611,325 | 12/1926 | Tashjian | 52/221 |
| 1,718,252 | 6/1929 | Putnam | 439/209 |
| 3,255,563 | 6/1966 | Sauer | 52/221 |
| 3,708,607 | 1/1973 | Brode et al. | 52/221 |
| 3,983,670 | 10/1976 | Lightfoot | 52/220 |
| 4,159,604 | 7/1979 | Burrell | 52/729 |
| 4,224,769 | 9/1980 | Ball et al. | 52/221 |
| 4,448,004 | 5/1984 | Thorsell | 52/481 |
| 4,453,363 | 6/1984 | Koller | 52/729 |
| 4,470,232 | 9/1984 | Condevaux et al. | 52/220 |
| 4,593,505 | 6/1986 | Russell | 52/221 |
| 4,631,881 | 12/1986 | Charman | 52/220 |
| 4,713,918 | 12/1987 | Cioffi | 52/221 |

FOREIGN PATENT DOCUMENTS

| | | | |
|---|---|---|---|
| 132543 | 3/1933 | Austria | 52/220 |
| 2166565 | 7/1974 | Fed. Rep. of Germany | 52/220 |
| 2359361 | 7/1974 | Fed. Rep. of Germany | 52/221 |
| 635440 | 12/1927 | France | 52/220 |
| 2161527 | 1/1986 | United Kingdom | 52/729 |

*Primary Examiner*—Michael Safavi
*Attorney, Agent, or Firm*—Laird F. Miller; Robert F. Hause

[57] ABSTRACT

An electrical raceway floor track and a partition embodying such floor track wherein the floor track is an elongate aluminum extrusion with a relatively wide upwardly opening lower channel connected to a relatively narrower upwardly opening upper channel by a solid rigid vertical wall. Wallboards and studs are supported by the upper channel, utilities are disposed between the channels and base trim strips are attached to the lower channel to hide the track and utilities. Electrical boxes and cable shelves are easily mounted between the channels with clips engaging ridges in the channels. Shallow grooves guide during screw insertion and provide lines of weakness for removal of short narrow sections where needed.

3 Claims, 3 Drawing Sheets

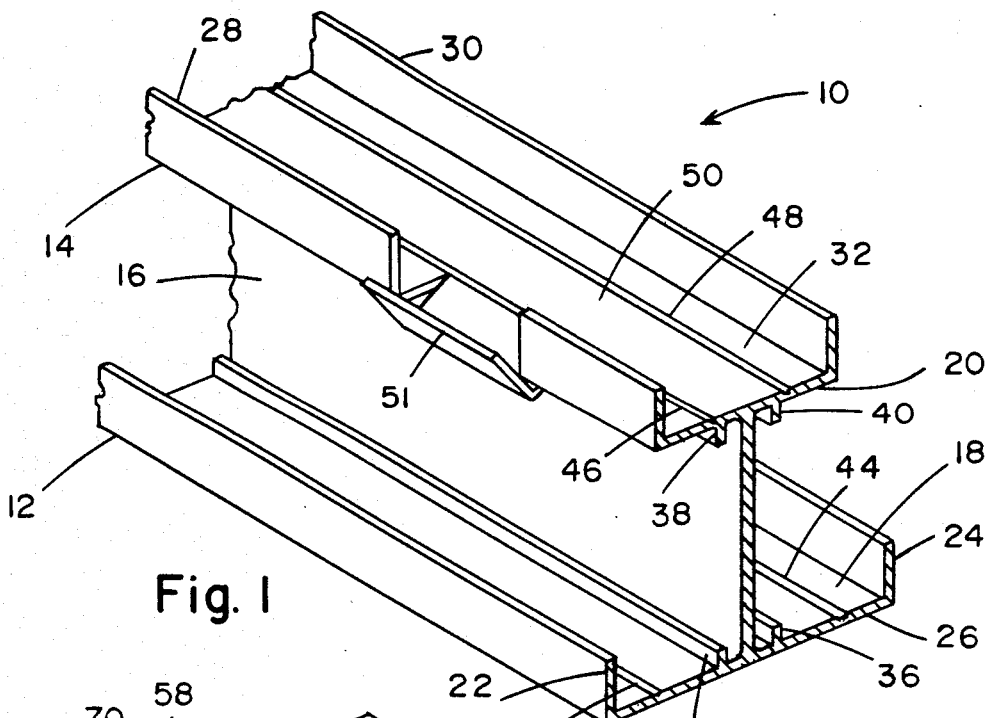
Fig. 1
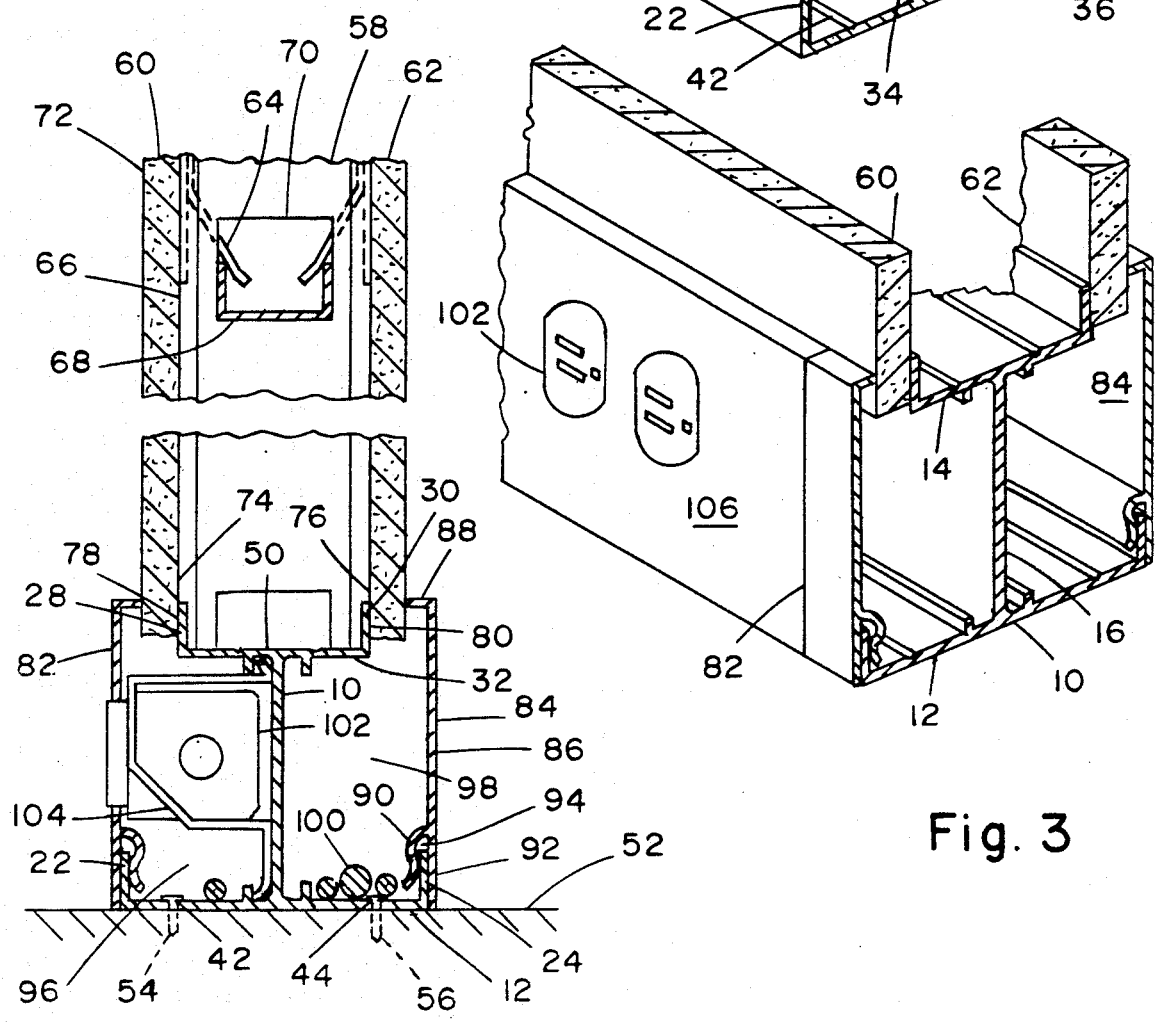
Fig. 2
Fig. 3

ELECTRICAL RACEWAY FLOOR TRACK

BACKGROUND OF THE INVENTION

This invention relates to an improved floor track for a demountable partition having a plurality of novel elements which provide versatility in respect to placement of utilities, such as electric wires and conduit, telephone wires, and electric and telephone outlet boxes.

U.S. Pat. Nos. 3,255,563 and 4,593,505 disclose two examples of relatively complex electrical raceway floor tracks, in which elongate members are affixed to a floor, which members include an elongate hollow space for containing horizontal electric and phone conduits, and a top surface for supporting the wall elements.

SUMMARY OF THE INVENTION

The present invention is directed to an improved and simplified electrical raceway floor track, formed essentially as an elongate, extruded aluminum wide lower channel, narrow upper channel and a connecting, relatively strong vertical wall, connecting the center of the top surface of the lower channel with the center of the bottom surface of the upper channel. Each of the lower channel and upper channel has upwardly extending flanges along each lateral edge of a horizontal web portion.

Short, elongate ridges are formed on the top surface of the lower channel web portion and the bottom surface of the upper channel web portion on each side of the vertical wall, spaced closely therefrom, for receiving and retaining resilient clips which support various utility elements. Shallow, narrow, elongate grooves are formed in the top surface of the upper channel web portion above and preferably slightly outwardly from each of the upper channel ridges. Shallow, narrow, elongate grooves are also formed in the top surface of the lower channel web portion, spaced inwardly about ½ to 1 inch from each flange.

A partition is constructed by supporting wall elements on the upper channel, placing utilities in between the two channels and closing the space between the lower channel and the partition wall elements with an elongate base trim affixed to each lower channel flange.

It is an object of the invention to provide a novel and improved electrical raceway floor track.

It is a further object to provide such a floor track of a single aluminum extrusion which provides a support for partition elements, retaining means for utility elements and retaining means for a utilities concealing base strip.

It is a still further object to provide such a floor track which also includes means for removal of properly sized areas to permit extending utility elements upward into the cavity of a supported hollow wall.

BRIEF DESCRIPTION OF THE DRAWINGS

These and other objects and advantages will be more readily apparent when considered in relation to the preferred embodiment of the invention as set forth in the shown in the drawings in which:

FIG. 1 is an isometric view of a section of electrical raceway floor track embodying the present invention, including a portion being removed for extending conduit upward.

FIG. 2 is a vertical sectional view of a partition wall constructed using the electrical raceway floor track of FIG. 1, with electrical conduit, electric outlet box, electric outlet box clip, a wall stud, wallboards and base trim all shown.

FIG. 3 is an isometric view of a section of the base trim, electrical outlet and the wallboard of FIG. 2.

DESCRIPTION OF THE PREFERRED EMBODIMENTS

Figure 4:
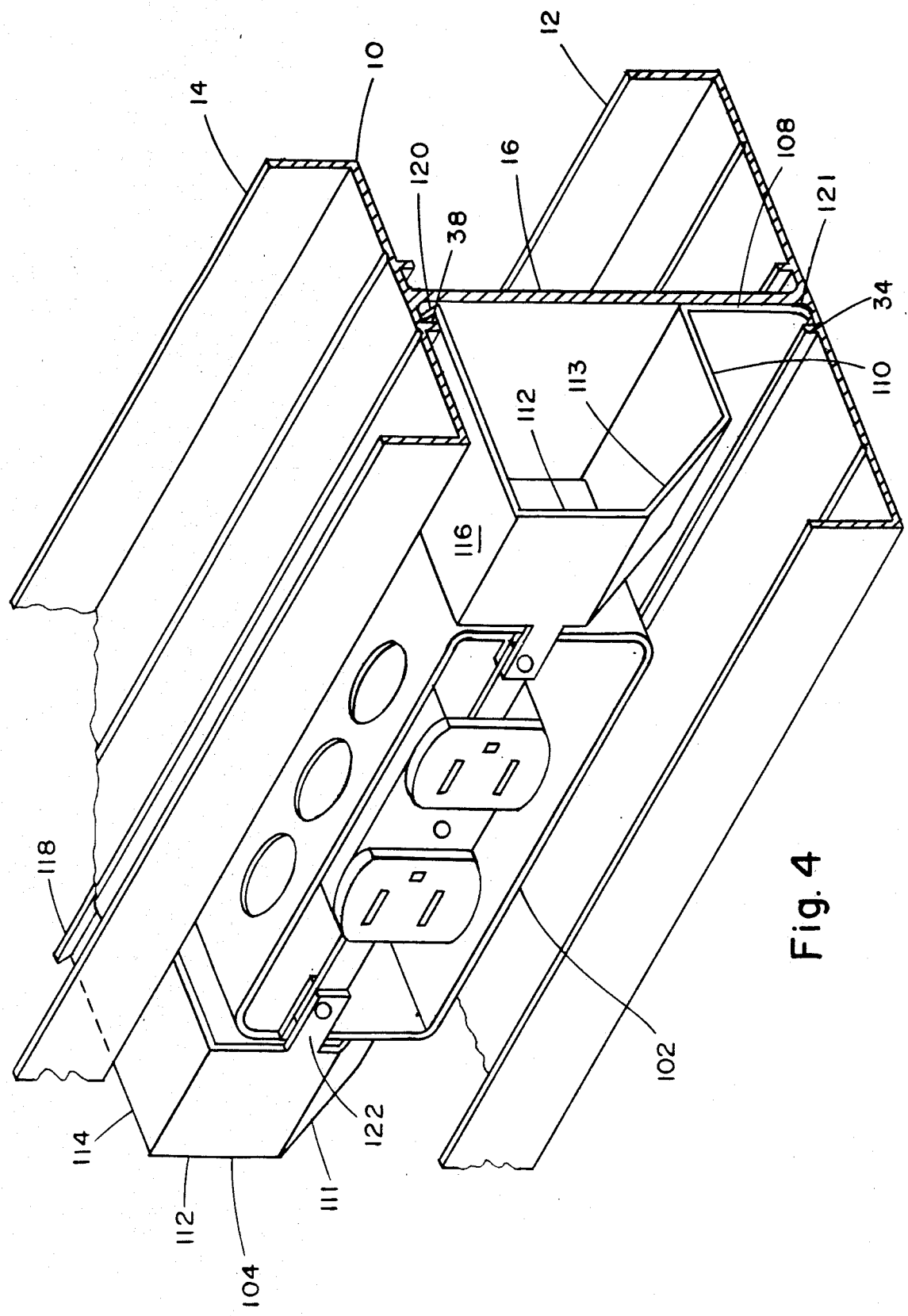
FIG. 4 is an isometric view of the section of floor track of FIG. 2 showing the electric outlet box and the electric outlet box clip affixed to the floor track.

Referring to FIG. 1, there is shown an electrical raceway floor track 10 which is an elongate aluminum extrusion which includes a relatively wide lower channel 12, a relatively narrower upper channel 14, and an interconnecting, relatively strong, sound-stopping solid vertical wall 16, connecting the center of the top surface 18 of the lower channel 12 with the center of the bottom surface 20 of upper channel 14.

The lower channel 12 includes upwardly extending flanges 22, 24 along the two respective lateral edges of a horizontal web portion 26. The upper channel 14 includes upwardly extending flanges 28, 30 along the two respective lateral edges of a horizontal web portion 32.

Short, elongate ridges 34, 36 are formed on the top surface 18 of lower channel web portion 26, on each side of the vertical wall 16, spaced closely therefrom. Short, elongate ridges 38, 40 are formed on the bottom surface 20 of upper channel web portion 32, on each side of the vertical wall 16, spaced closely therefrom.

Shallow, narrow, elongate grooves 42, 44 are formed in the top surface 18 of lower channel web portion 26, located inwardly about ⅜ inch from the respective flanges 22, 24. Shallow, narrow, elongate grooves 46, 48 are formed in the top surface 50 of upper channel web portion 32, located respectively slightly outwardly of above ridges 38, 40.

The shallow grooves 46, 48 are provided primarily to permit the easy and rapid removal of short narrow sections, of upper channel 14, such as short section 51, to form passageways for conduit or cable to be placed through to extend from the electrical raceway below upper channel 14 to a hollow wall cavity above upper channel 14. The short section 51 is removed by cutting two cuts through the flange 28 and through the outer edge of web 32 back to groove 46, and bending the section 51 along the weak fold line formed by groove 46 until it breaks.

Referring now to FIG. 2, the floor track 10 is shown attached to a floor 52 by screw 54, 56 which have been inserted through lower channel 12, at grooves 42, 44 respectively, into floor 52. Grooves 42, 44 provide a means for properly locating the screws 54, 56 during insertion and for steadying the screws 54, 56 during insertion.

Grooves 42, 44 also provide a line of weakness for removing short sections of flanges 22, 24 at door frames, wall terminations and corners, if necessary, by cutting back to the groove 42 or 44 and bending at the groove 42 or 44 to break off a short section.

Supported on the top surface 50 of upper channel web portion 32 is a standard sheet metal vertical stud 58 of any suitable cross-sectional configuration, such as a standard C-shaped screw stud or an I-stud. Affixed to stud 58, on each face thereof, is gypsum wallboard 60, 62, preferably affixed by suspension clip assemblies 64 which are piercingly engaged in the back face 66 of wallboard 60 and which are hung on an upwardly opening channel 68 extending through knock-outs 70 in a plurality of parallel vertical studs 58, located at two-foot spacings along partition or wall 72. This preferred method of affixing wallboards to studs is more thoroughly described in U.S. Pat. No. 4,128,979, the disclosure of which is hereby incorporated by reference.

Wallboard 60, 62 can also be affixed to studs 58 by screws or an adhesive, in accordance with the present invention.

In a typical wall constructed in accordance with the invention, the stud 58 would have a face-to-face dimension of about 2-½ inches and would extend from flange 28 to flange 30. The bottom edges 74, 76 of wallboard 60, 62 would be disposed against the outer surfaces 78, 80 of flanges 28, 30.

Elongate rigid plastic base trim 82, 84 is formed of a wide elongate face portion 86, a short elongate perpendicular flange 88 extending inwardly from the top of face portion 86 and abutting wallboards 60, 62, and a spring-like clip portion 90 near the bottom which with the bottom edge 92 of face portion 86 forms a downwardly opening channel 94 shaped to receive and grasp upwardly extending flanges 22, 24. With the bottom of face portion 86 abutting floor 52 and the short flange 88 at the top of base trim 82, 84 abutting the wallboard, an attractive cover is provided to conceal the floor track 10.

Above lower channel 12, below upper channel 14 and between wall 16 and each base trim 82, 84, a sizeable elongate hollow path 96, 98 is created, suitable for locating cables 100, which may be electrical conduit or wire or telephone wire, as may be desired. Located within hollow path 96 is also an electrical outlet box 102, of standard commercial construction, held in place by an outlet box clip 104, and having two electrical outlets protruding through a special outlet section 106 of base trim, as better shown in FIG. 3.

Referring to FIG. 4, the outlet box clip 104 is more clearly shown. Clip 104 is about eight inches long, and includes an eight inch long, one inch high vertical bottom leg 108, a horizontal forwardly extending second leg 110, about 1 inch by eight inches, a pair of diagonal legs 111, 113, a vertical upwardly extending bifurcated front face 112, a pair of horizontal rearwardly extending third legs 114, 116 and at the rearward end thereof, upwardly extending short flanges 118, 120.

The clip 104 is locked in place by the bottom leg 108 being disposed behind the lower ridge 34 and the flanges 118, 120 being disposed behind the upper ridge 38. A slight radius 121 in the metal at the junctions of the wall 16 with the upper and lower channels holds the clip 104 against the ridges 34, 38.

The bifurcated portions of face 112 form an opening approximately the shape of electrical outlet box 102 and they include inwardly extending fingers 122 located for the screw attachment of box 102 to clip 104.

Figure 5:
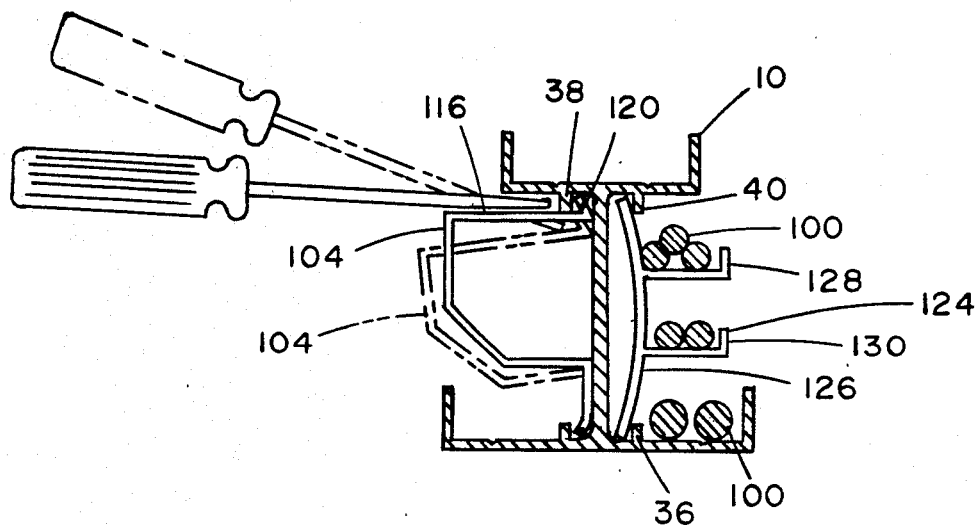
FIG. 5 is a vertical sectional view of the floor track of FIG. 2 showing the removal of the electric outlet box clip on one side and showing a cable support clip for separating a plurality of cables affixed to the floor track on the opposite side.

FIG. 5 shows, in phantom, the method by which clip 104, third legs 114, 116 are bent downward slightly to insert and to remove clip 104 relative to its locked position with flanges 118 and 120 behind upper ridge 38.

FIG. 5 also shows an optional rigid polyvinyl chloride cable support 124 which is an elongate extrusion including an elongate back face 126 and a pair of horizontal elongate shelves 128, 130, on which different sets of cables 100 are supported. The back face 126 is flexible enough to be snapped behind the ridges 36, 40 and rigid enough to resist removal when cables 100 are placed on shelves 128, 130.

Figure 6:
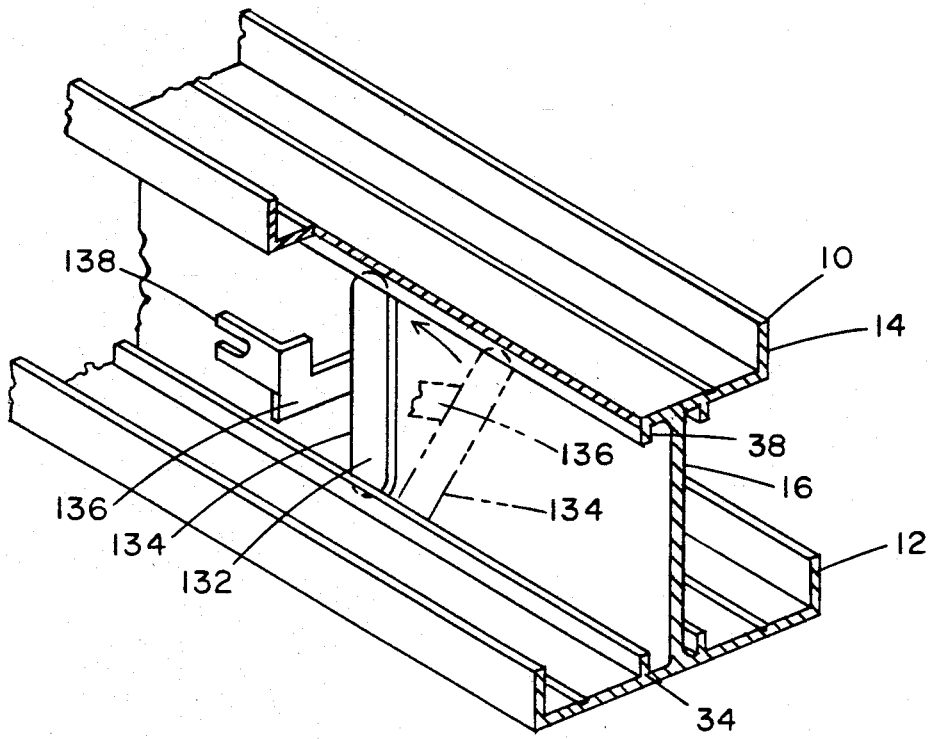
FIG. 6 is an isometric view of the electric raceway floor track of FIG. 4 with a modified electric outlet box clip.

FIG. 6 shows an optional form of clip 132 which can be used to mount electrical outlet boxes. Clip 132 has a flat vertical back 134 disposed behind ridges 34, 38 with a forwardly extending leg 136 and a sidewardly extending bifurcated lip 138. Used in conjunction with a second similar but opposite clip (not shown) placed to support the opposite end of an electrical outlet box, this combination provides a simplified alternative for clip 104.

The preferred embodiment of the present invention consists of a track 10 which is an aluminum extrusion in which the lower channel 12 is about four inches wide, the upper channel is about two-and-a-half inches wide, the flanges 22, 24 are about ⅜ inch tall, flanges 28, 30 are about ⅜ inch tall and the overall track 10 is about four inches tall. Ridges 34, 36, 38, 40 have a height preferably about 0.1 inch. The thickness of most portions of track 10 vary from about 0.04 to 0.08 inch while vertical wall 16 is of about 0.125 inch thickness.

The gypsum wallboard 60, 62 is of about ⅜ to ⅝ inch thickness and the base trim is preferably about four inches in width.

The present invention can also be used with glazing replacing the hollow wallboard partition, particularly in short sections of an overall wall, such as a two foot wide window section each side of a doorway.

Having completed a detailed disclosure of the preferred embodiments of my invention so that those skilled in the art may practice the same, I contemplate that variations may be made without departing from the essence of the invention.

What I claim is:

1. A partition comprising a floor track and partition elements including wallboard, said floor track comprising a single elongate electrical raceway floor track having an upwardly opening lower channel, an upwardly opening upper channel disposed in spaced parallel relationship over said lower channel, and a vertical wall connecting said lower channel and said upper channel, whereby a partition can be supported on said upper channel, utilities can be disposed between said channels and a base trim can be affixed to said track to conceal said track, wherein said upper channel supports said partition elements including said wallboard, wherein elongate utility elements are disposed in a hollow path formed between said upper and lower channels and between said vertical wall and a base trim affixed to said track, wherein a short section of upper channel has been removed forming a space thereat extending in width from an outer edge of said upper channel to a narrow shallow elongate groove in said upper channel, and wherein utility elements extend upward through said space created by said removal of said section of upper channel.

2. In combination, a floor track for partition walls comprising a single elongate electrical raceway floor track having an upwardly opening lower channel, an upwardly opening upper channel disposed in spaced parallel relationship over said lower channel, and a vertical wall connecting said lower channel and said upper channel, whereby a partition can be supported on said upper channel, utilities can be disposed between said channels and a base trim can be affixed to said track to conceal said track, wherein said upper channel has a bottom surface and said lower channel has a top surface, and wherein ridges are formed in said bottom surface of said upper channel and in said top surface of said lower channel, said ridges extending in close parallel relationship to said vertical wall, said channels each having two portions, one of each of said two portions being disposed in one first direction from said vertical wall and a second of each of said two portions being disposed in an opposite direction from said vertical wall, said ridges being disposed in all of said portions, and an electrical outlet box retainer clip affixed within said floor track, said clip having a bottom leg disposed behind said ridge in said top surface of said lower channel and at least one upwardly extending flange disposed behind said ridge in said bottom surface of said upper channel, and means for retaining an outlet box between said top surface and said bottom surface, said means including a bifurcated face which forms an opening in which a face of an outlet box can be disposed and further including inwardly directed fingers for screw attachment of a box to said clip.

3. In the combination of claim 2 wherein said bifurcated face is connected to a pair of diagonal legs connecting said face to said bottom leg, to permit removal of said upwardly extending flange from behind said ridge in said bottom surface of said upper channel.

* * * * *